(12) United States Patent
Wright et al.

(10) Patent No.: US 6,544,028 B2
(45) Date of Patent: Apr. 8, 2003

(54) INJECTION MOLDING MACHINE HAVING A MIXER INSERT

(75) Inventors: Corin A. Wright, South Hero, VT (US); Abdeslam Bouti, Swanton, VT (US); Paul R. Blais, South Burlington, VT (US)

(73) Assignee: Husky Injection Molding Systems, Ltd, Bolton (CA)

( * ) Notice: Subject to any disclaimer, the term of this patent is extended or adjusted under 35 U.S.C. 154(b) by 63 days.

(21) Appl. No.: 09/908,275

(22) Filed: Jul. 18, 2001

(65) Prior Publication Data

US 2002/0105113 A1 Aug. 8, 2002

Related U.S. Application Data

(63) Continuation-in-part of application No. 09/845,399, filed on Apr. 30, 2001, which is a continuation-in-part of application No. 09/605,763, filed on Jun. 28, 2000, now Pat. No. 6,382,528, which is a continuation-in-part of application No. 09/435,965, filed on Nov. 8, 1999, now Pat. No. 6,089,468.

(51) Int. Cl.[7] .............................................. B29C 45/17
(52) U.S. Cl. ................................. 425/572; 264/328.12
(58) Field of Search ............................... 425/572, 588; 264/328.12; 366/340, 336

(56) References Cited

U.S. PATENT DOCUMENTS

| | | | |
|---|---|---|---|
| 3,156,013 A | 11/1964 | Elphie | |
| 3,802,825 A | 4/1974 | Upmeier | 425/378 |
| 3,911,073 A | 10/1975 | Charles-Massance | 264/171 |
| 3,989,434 A | 11/1976 | Mercer | 425/207 |
| 4,072,037 A | 2/1978 | Fuchs, Jr. | 72/261 |
| 4,361,407 A * | 11/1982 | Pellegrini | 366/340 |
| 4,514,095 A * | 4/1985 | Ehrfeld et al. | 366/340 |
| 4,541,982 A | 9/1985 | Upmeier | 264/349 |
| 4,790,992 A * | 12/1988 | Nishikawa | 366/336 |
| 4,848,920 A | 7/1989 | Heathe et al. | 366/339 |
| 4,965,028 A | 10/1990 | Maus et al. | 264/297.2 |
| 5,405,258 A | 4/1995 | Babin | 475/549 |
| 5,683,731 A | 11/1997 | Deardruff et al. | 425/572 |
| 5,688,462 A | 11/1997 | Salamon et al. | 264/328.14 |
| 6,089,468 A * | 7/2000 | Bouti | 239/11 |
| 6,382,528 B1 * | 5/2002 | Bouti | 239/489 |

FOREIGN PATENT DOCUMENTS

EP 0293756 5/1988

* cited by examiner

Primary Examiner—Tim Heitbrink (57) ABSTRACT

A mixer method and apparatus for use generally in injection molding machines is provided. The apparatus and method is generally comprised of a mixer insert that retains a mixing element that is sealingly inserted in the injection molding machine, for example a hot runner manifold. The mixing element reduces the melt imbalances in a flowing melt stream for the formation of improved molded parts.

39 Claims, 7 Drawing Sheets

INJECTION MOLDING MACHINE HAVING A MIXER INSERT

CROSS-REFERENCE TO RELATED APPLICATIONS

This is a Continuation-In-Part of co-pending application Ser. No. 09/845,399 filed Apr. 30, 2001 which is a Continuation-In-Part of co-pending Ser. No. 09/605,763 filed Jun. 28, 2000 now U.S. Pat. No. 6.382,528 which is a Continuation-In-Part of co-pending Ser. No. 09/435,965 filed Nov. 8, 1999 now U.S. Pat. No. 6,089,468, all of which are incorporated herein by reference.

BACKGROUND OF THE INVENTION

1. Field of the Invention

This invention relates to injection molding machines for the transmission of various molten materials to a mold cavity or cavities. More specifically, this invention relates to a method and apparatus for the insertion of a mixer in the melt stream of an injection molding machine.

2. Summary of the Prior Art

The large number of variables in the injection molding process creates serious challenges to creating a uniform and high quality part. These variables are significantly compounded within multi-cavity molds. Here we have the problem of not only shot to shot variations but also variations existing between individual cavities within a given shot.

Shear induced flow imbalances occur in all multi-cavity molds that use the industry standard multiple cavity "naturally balanced" runner system whereby the shear and thermal history within each mold is thought to be kept equal regardless of which hot-runner path is taken by the molten material as it flows to the mold cavities. These flow imbalances have been found to be significant and may be the largest contributor to product variation in multi-cavity molds.

Despite the geometrical balance, in what has traditionally been referred to as "naturally balanced" runner systems, it has been found that these runner systems can induce a significant variation in the melt conditions delivered to the various cavities within a multi-cavity mold. These variations can include melt temperature, pressure, and material properties. Within a multi-cavity mold, this will result in variations in the size, shape and mechanical properties of the product. Though the effect is most recognized in molds with eight or more cavities, it can create cavity to cavity variations in molds with as few as two cavities.

The flow imbalance in a mold with a geometrically balanced runner is created as a result of shear and thermal variations developed across the melt as it flows through the runner. The melt in the outer region (perimeter) of the runner's cross-section experiences different shear and temperature conditions than the melt in the center region. As flow is laminar during injection molding, the position of these variations across the melt stream is maintained along the length of the runner branch. When the runner branch is split, the center to perimeter variation becomes a side to side variation after the split. This side to side variation will result in variations in melt conditions from one side to the other of the part molded from the runner branch.

If the runner branches were to split even further, as in a mold with 4 or more cavities, there will exist a different melt in each of the runner branches. This will result in variations in the product created in each mold cavity. It is important to note that as consecutive turns and/or splits of the melt channel occur, the difference in melt temperature and shear history is further amplified. This cumulative effect is clearly recognized in large multi-cavity molds where the runner branches split and turn many times.

In an attempt to reduce this variation, the prior art has been primarily directed at various mixing devices that are located within the runner nozzle which is typically just prior the mold cavity. Examples of this can be found in U.S. Pat. No. 4,965,028 to Manus et al. and U.S. Pat. No. 5,405,258 to Babin.

Mixers at various locations within the injection molding machine are also well known. Examples of mixers in the hot runner manifold include U.S. Pat. No. 5,683,731 to Deardurff et al., European Patent 0293756, U.S. Pat. No. 5,688,462 to Salamon et al. and U.S. Pat. No. 4,848,920 to Heathe et al. (all incorporated herein by reference). An example of mixers installed within the injection unit can be found in U.S. Pat. No. 3,156,013 to Elphee (incorporated herein by reference).

Within the prior art, at least as much as known, there is no retrofit apparatus or method for installation of a mixer in an already existing injection molding machine, specifically in the hot runner manifold. Attempts at alleviating runner imbalance has been directed at correcting the problem within the injection nozzle or further upstream in the machine nozzle or sprue bar.

There exists a need for a mixer apparatus and method that allows for the easy and precise placement of a mixer in the melt stream in an injection molding machine, for example in a hot runner subsystem. Preferably, the mixer should be installed just upstream of where the melt channel splits or divides.

SUMMARY OF THE INVENTION

One general objective of the present invention is to provide a mixer apparatus and method that can be easily and precisely placed in an injection molding machine to help alleviate non-homogenity in a melt stream.

Another general object of the present invention is to provide a replaceable mixer insert apparatus and method in an injection molding machine.

Yet another general object of the present invention is to provide a mixer apparatus and method that is completely contained within the hot runner manifold.

The foregoing objects are achieved in one exemplicative embodiment by providing a mixer insert that is sealing placed in a receiving bore, for example, in a hot runner manifold. The mixer insert contains a mixing element that is held in alignment with and communicates with a melt channel. As the non-homogeneous melt flows through the mixing element it is mixed and homogenized thereby reducing melt stream imbalances.

Further objects and advantages of the present invention will appear hereinbelow.

BRIEF DESCRIPTION OF THE DRAWINGS

FIGS. 1a–1c are simplified cross-sectional views of an exemplicative embodiment of the present on;

DETAILED DESCRIPTION OF THE PREFERRED EMBODIMENTS

Figures 1A, 1B, 1C:
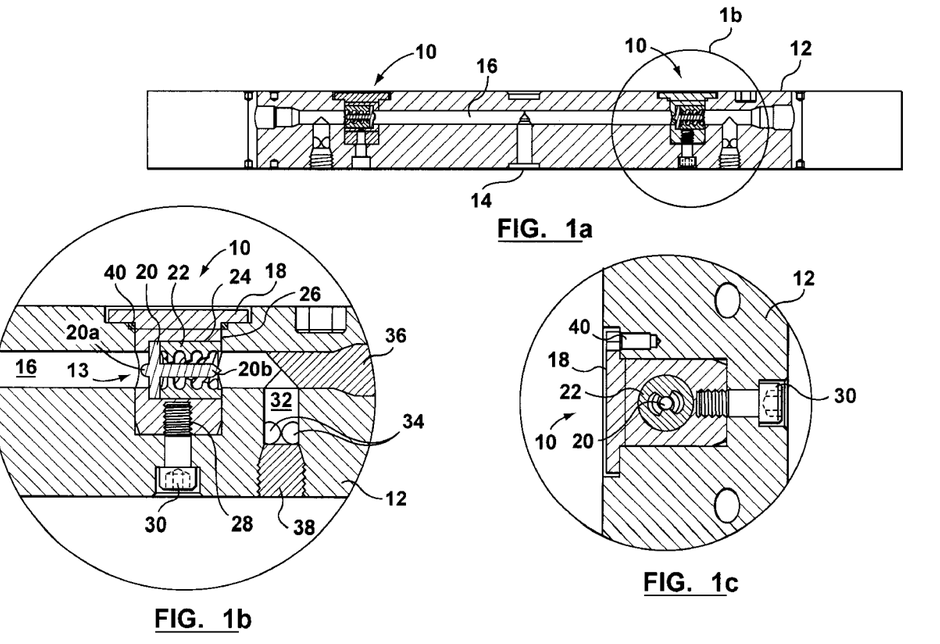

Referring first to FIGS. 1a–1c, cross-sectional views of an exemplicative embodiment of the present invention are shown. A mixer assembly 10 is sealingly inserted into a manifold bore 26 which is formed in a hot runner manifold 12. Mixer assembly 10 is comprised of a mixer insert 18, which in a preferred embodiment is comprised of a metallic cylindrical bushing with optional flanges 19 protruding from a top surface of the insert 18. An insert passageway 24 is formed in the mixer insert 18 perpendicular to its longitudinal axis for receipt of a mixing element 13. The insert passageway 24 aligns with and communicates with a melt channel 16 when the mixer assembly 10 is fully seated in the manifold 12. It should be noted that while the embodiments described herein are directed at cylindrically shaped mixer inserts 18, one skilled in the art could easily provide myriad alternative embodiments comprising various shapes, attachment means and mixing elements therein. All such variations are fully contemplated by the present invention.

As shown in FIG. 1b, the insert passageway 24 is a stepped bore, with one portion sized to receive and retain a mixing element 13. For illustrations purposes only and not by limitation, the mixing element 13 in this embodiment is comprised of a torpedo 20 which is co-axially inserted in a mixer bushing 22. The mixer bushing 22 is also retained in the insert passageway 24. In a preferred embodiment, the torpedo 20 and the mixer bushing 22 are press fit in the insert passageway 24. This helps to reduce leakage around the mixer, however, such a retaining means may not be necessary due to the manner in which the mixer bushing and torpedo are already retained inside the mixer insert 18. Mixing element 13 could easily be modified by one skilled in the art to be any of the known static melt mixers.

An optional seal 40 may be provided around the periphery of the mixer insert 18 to reduce or eliminate the leakage of any molten material. An optional fastener 30 is provided to retain the insert 18 in the manifold 12. In a preferred embodiment the fastener 30 is threaded into a threaded bore 28 located in the mixer insert 18 to rigidly affix the mixer assembly 10 in the manifold 12. An optional alignment feature 42 is provided to maintain the alignment of the entrance 20a with the melt channel 16. In a preferred embodiment, the alignment feature 42 is a pin press fit into the manifold 12 that interfaces with one of the flanges 19. Alternatively, flat edges on the flanges 19 could be used for alignment through insertion of the flanges into a appropriately shaped pocket in the manifold 12.

As shown in FIG. 1a, the mixer assembly 10 is placed in various locations in the hot runner manifold 12. The melt enters the manifold 12 at melt inlet 14 and splits into melt channels 16. Melt channel 16 communicates with an entrance 20a of the mixer assembly 10 and the molten material is forced through the mixer bushing 22 where exit 20b further communicates with a second melt channel 32. Second melt channel 32 further splits into a plurality of third melt channels 34. Plugs 36 and 38 are affixed in manifold 12 to direct the molten material through the manifold 12. Preferably, as shown in FIG 1a, the mixer assembly 10 is installed just before the melt channel splits. This placement helps reduce the melt flow imbalances that adversely impact the quality of a molded part.

Figure 2:
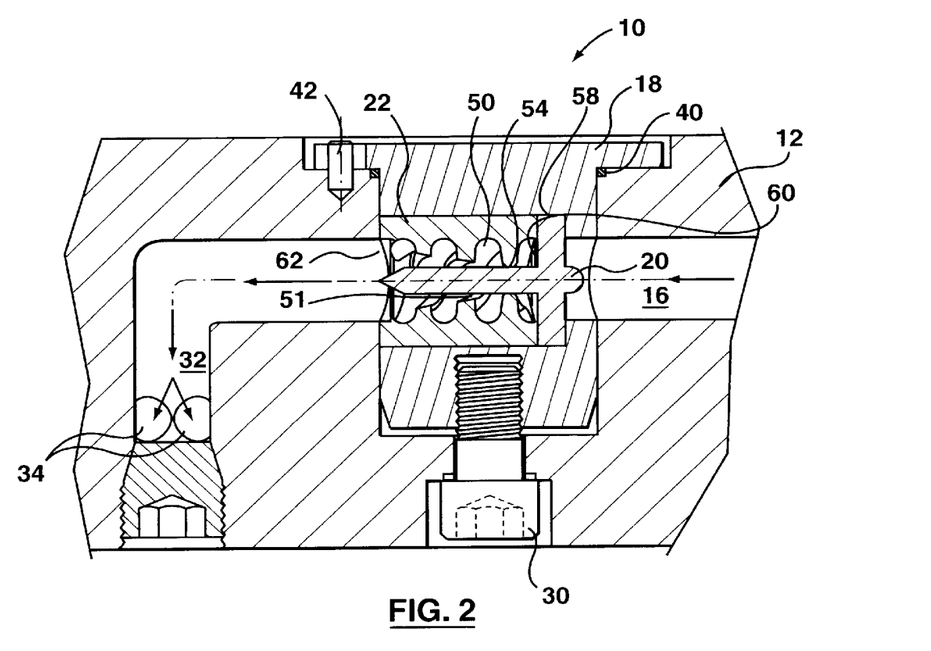
FIG. 2 is an enlarged cross-sectional view of an exemplicative embodiment of the present invention.
Figure 2A:
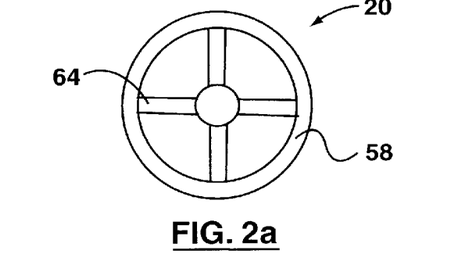
FIG. 2a is an end view of the elongated torpedo.

Referring now to FIGS. 2 and 2a, which shows an enlarged cross-sectional view in accordance with one preferred embodiment in accordance with the present invention where like features have like numerals. The mixer bushing 22 has at least one helical groove 50 formed therein running from an inlet 60 to the outlet 62 for communication of the fluid through the mixer assembly 10. An elongated torpedo 20 is inserted into the mixer bushing 22 and is maintained in a preferably coaxial position by at least one land 54 formed between the helical groove 50. Adjacent the flow inlet 60, the torpedo 20 is comprised of an annular disk 58 which abuts against one end of the mixer bushing 22. A plurality of spokes 64 extend from the center of the torpedo 20 to annular disk 58, thereby creating space for the flowing melt as it enters the mixer assembly 10. As the helical groove 54 and lands 56 travel along the direction of the melt flow, a gap 51 which increases in the direction of the melt flow, is formed between the elongated torpedo 20 and the mixer bushing 22. The cross-sectional area of the helical groove 50 also decreases in the direction of the melt flow.

As the melt travels through mixer bushing 22, more and more of the melt gradually spills out of the helical groove 50 and over lands 54 such that the melt flow transitions from all helical to all annular flow. This mixing action has been shown to substantially eliminate flow imbalances that occur inside a melt stream.

Figure 3:
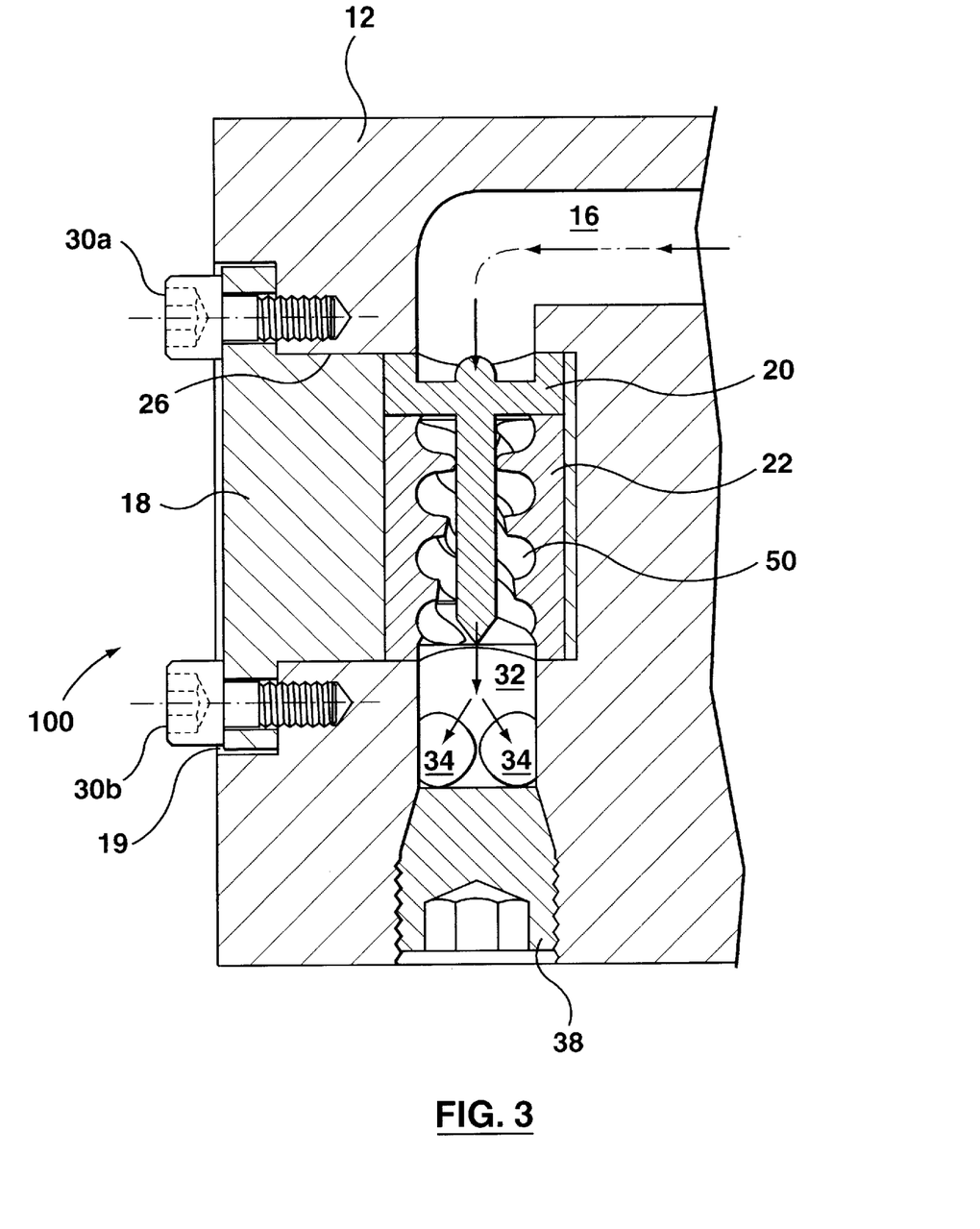
FIG. 3 is a simplified cross-sectional view of a second exemplicative embodiment of the present invention.

Referring to FIG. 3, (where like features have like numerals) a second embodiment 100 of the mixer assembly in accordance with the present invention is generally shown. In this embodiment, the mixer insert 18 is attached to the side of a typical hot runner manifold 12 after a 90-degree turn of melt channel 16. In a preferred embodiment, a plurality of fasteners 30a and 30b are inserted through a respective hole in flange 19 and affixed to manifold 12 for retention of the mixer insert 18.

Figure 4:
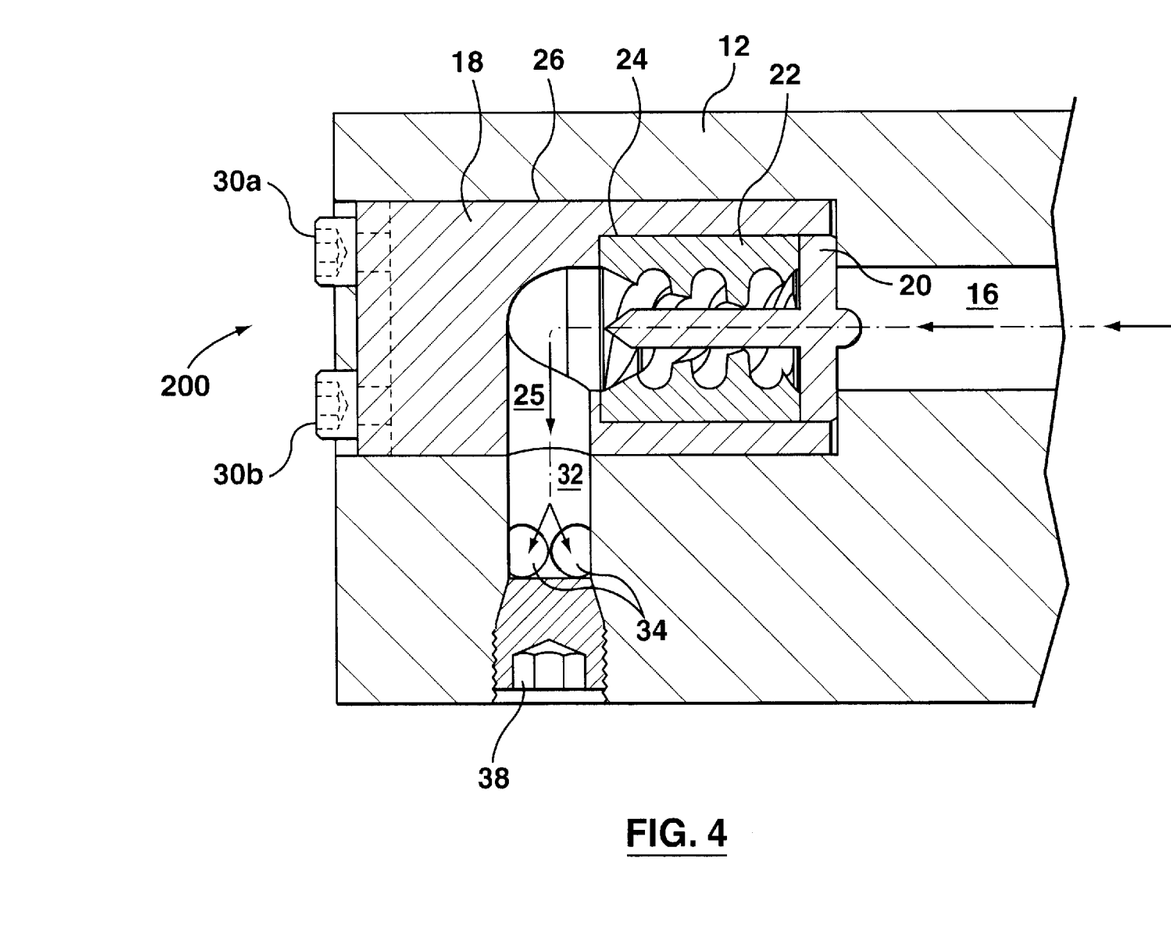
FIG. 4 is a simplified cross-sectional view of a third exemplicative embodiment of the present invention.

Referring to FIG. 4 (where like features have like numerals), a third preferred embodiment 200 in accordance with the present invention is generally shown. In this embodiment, and similar to second embodiment 100, the mixer insert 18 is placed in the manifold bore 26 which is formed through a side of the manifold 12. The mixer insert 18 has an additional melt passageway 25 formed therein at 90 degrees from the insert passageway 24 thereby forming a 90 degree corner in the mixer insert 18 downstream from the mixer bushing 22. Optionally, a plurality of fasteners 30a and 30b are used to affix the mixer assembly 200 in the manifold 12.

Figure 4A:
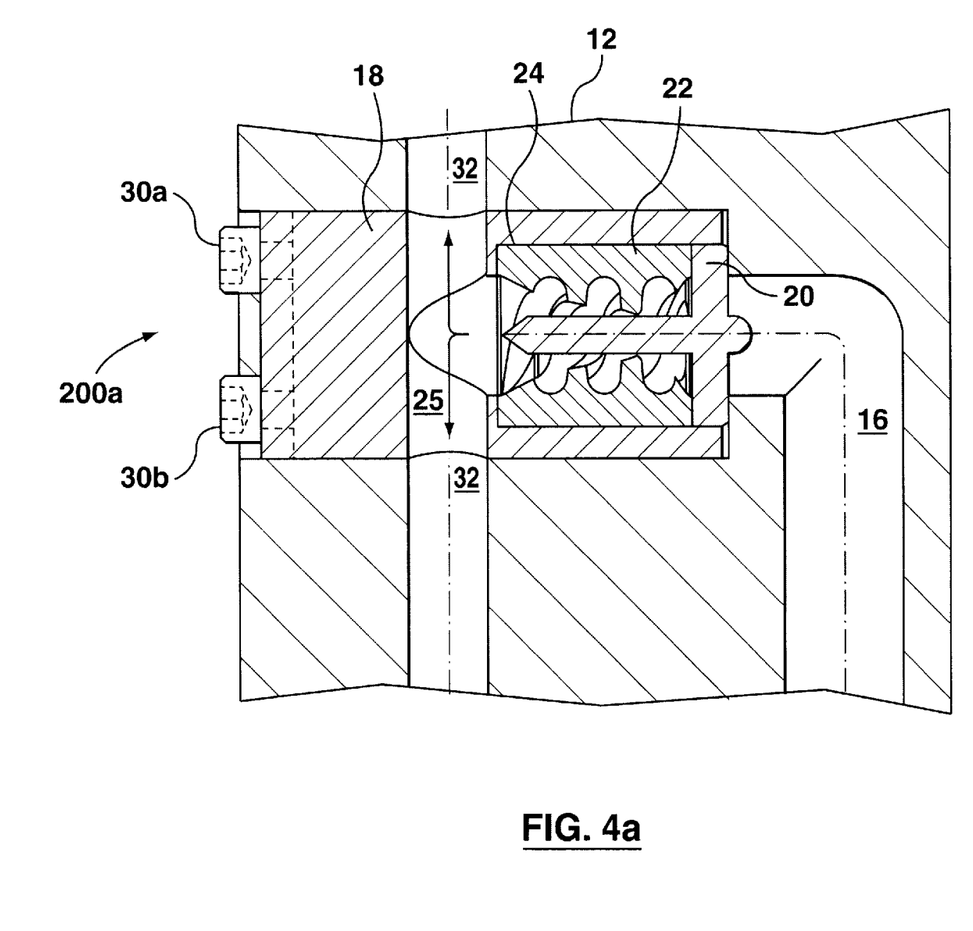
FIG. 4a is a simplified cross-sectional view of a fourth exemplicative embodiment of the present invention.

Referring now to FIG. 4a (where like features have like numerals), a fourth embodiment 200a in accordance with the present invention is generally shown. In this embodiment, the insert melt passageway 25 is in fluid communication with multiple second melt channels 32. As such, the branching of the melt channel 16 occurs within the mixer insert 18 rather than in the manifold 12.

Figure 4B:
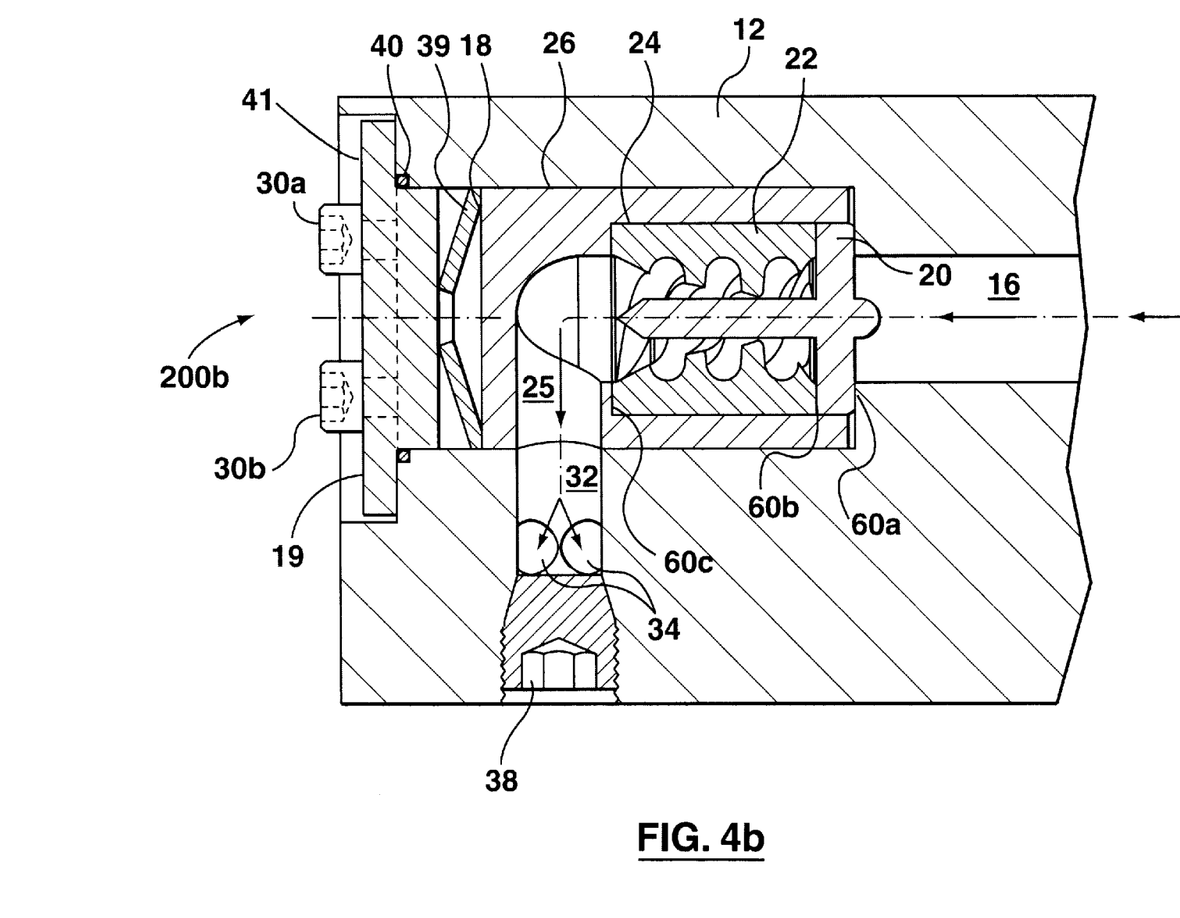
FIG. 4b is a simplified cross-sectional view of a fifth exemplicative embodiment of the present invention.

Referring now to FIG. 4b (where like features have like numerals), a fifth embodiment 200b in accordance with the present invention is generally shown. In this embodiment a spring element 39 abuts the mixer insert 18 and is held thereon by a cap 41 which is affixed to the manifold 12. In the preferred embodiment, the cap 41 has a flange 19 and an optional seal 40 to reduce leakage. The spring element 39 in the preferred embodiment is a belleville type disc spring, but could easily be made from any suitable resilient material.

The use of the spring element 39 reduces the need for tight tolerance parts that would normally be required to provide a reliable seal against the high pressure melt. The spring element 39 allows for the cap 41 to sealing seat on a surface of the manifold 12 while also providing a compressive force between the mating surfaces, (for example surface 60*a*, 60*b* and 60*c*) to prevent or substantially reduce leakage of the high pressure melt therebetween.

Figure 5:
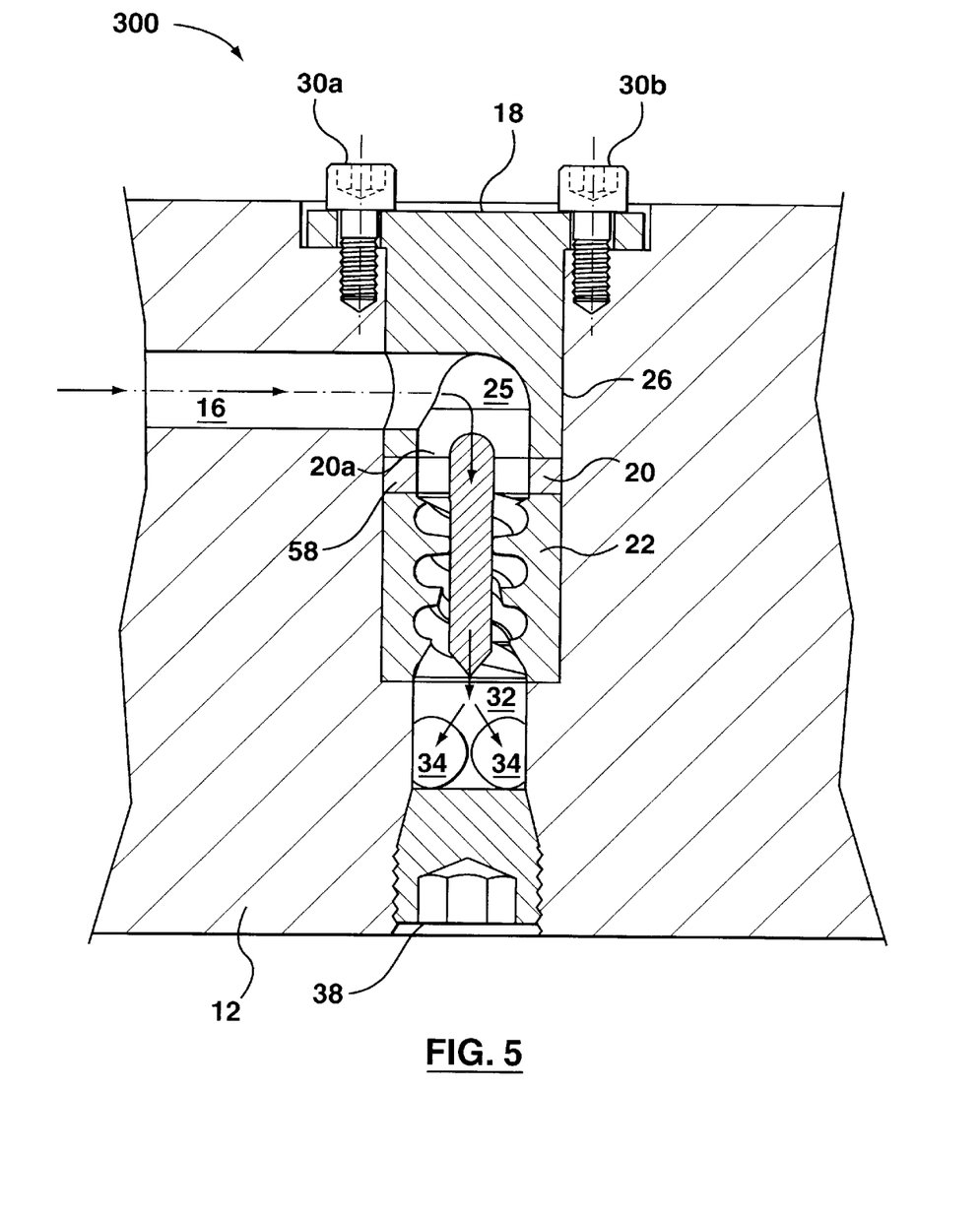
FIG. 5 is a simplified cross-sectional view of a sixth exemplicative embodiment of the present invention.

Referring now to FIG. 5 (where like features have like numerals), a sixth preferred embodiment 300 in accordance with the present invention is generally shown. In this embodiment, the mixer insert 18 is inserted from a top surface of manifold 12 and provides a 90 degree turn just upstream of the mixer entrance 20*a* where melt passageway 25 interfaces with torpedo 20. The annular disk 58 of the elongated torpedo is retained between the mixer insert 18 and the mixer bushing 22. It should be noted that in this embodiment, the mixer bushing 22 is not retained in the mixer insert 18 but rather is seated in the manifold bore 26 and abuts against the annular disk 58 of the torpedo 20. Again, an optional plurality of fasteners 30*a* and 30*b* are provided to retain the mixer insert 18 in the manifold 12 which in turn secures the torpedo 20 and mixer bushing 22 in alignment with the melt channel 16.

It should be noted that while the foregoing description provided only a single description for a mixing element, one skilled in the art could easily envision alternative mixing element arrangements, and as such, all such mixing element embodiments are fully contemplated within the scope of the present invention.

As can be seen, a mixer assembly is provided in accordance with the present invention that may easily and reliable be inserted at various points along a melt channel. Various configurations have been shown that allow insertion of a mixer into a hot runner subsystem that may be replaced or allow for insertion of alternate mixer bushing types to accommodate various molding parameters.

It is to be understood that the invention is not limited to the illustrations described herein, which are deemed to illustrate the best modes of carrying out the invention, and which are susceptible to modification of form, size, arrangement of parts and details of operation. The invention is intended to encompass all such modifications, which are within its spirit and scope as defined by the claims.

What is claimed is:

1. An injection molding machine having a supply of molten material for communication to a mold cavity comprising;
    a manifold having at least one melt channel formed therein for conveying said molten material from said supply to said mold cavity, and
    a mixer insert abutting a mixing element, said mixer insert sealingly placed in a bore of said manifold to align said mixing element with said at least one melt channel.

2. The injection molding machine of claim 1 wherein said manifold is heated.

3. The injection molding machine of claim 1 wherein said molten material is one selected from the group consisting of thermoplastics, thermosets, molten metals, resins and rubber.

4. The injection molding machine of claim 1 wherein said mixer insert further comprises at least one flange protruding from said mixer insert and is inserted in a relief formed in a surface of said manifold.

5. The injection molding machine of claim 4 wherein the alignment of said mixing element with said melt channel is provided by said flange.

6. The injection molding machine of claim 5 wherein the alignment of said mixing element with said melt channel is provided by an alignment pin that interfaces with at least one said at least one flange.

7. The injection molding machine of claim 5 wherein said mixer insert is rigidly affixed to said manifold by at least one selected from the group consisting of at least one threaded fastener, braising, welding, and press fit.

8. The injection molding machine of claim 7 wherein said at least one fastener is threaded into said manifold.

9. The injection molding machine of claim 5 further comprising at least one seal surrounding the periphery of said mixer insert for the reduction of leakage of said molten material.

10. The injection molding machine of claim 1 wherein said mixer insert is press fit into said bore.

11. The injection molding machine of claim 1 wherein said mixer insert is affixed to said manifold by at least one threaded fastener attached to a bottom face of said mixer insert.

12. The injection molding machine of claim 1 further comprising at least one seal along the periphery of said mixer insert.

13. The injection molding machine of claim 1 wherein said mixer insert further comprises:
    a cylindrical body having a longitudinal axis perpendicular to its diameter,
    an insert passageway formed in said cylindrical body perpendicular to said longitudinal axis for receipt and retention of said mixing element.

14. The injection molding machine of claim 1 wherein said mixing element further comprises:
    a mixer bushing having at least one helical groove formed on an internal surface therein,
    an elongated torpedo inserted coaxially in said mixer bushing, said torpedo running from an entrance to an exit of said mixing element.

15. The injection molding machine of claim 14 wherein said mixing element further comprises a series of lands that interface with an external surface of said torpedo.

16. The injection molding machine of claim 14 wherein said at least one helical groove decreases in depth in the direction of the molten material flow.

17. The injection molding machine of claim 16 wherein a gap between said lands and said external surface of said torpedo gradually increases in the direction of the molten material flow.

18. The injection molding machine of claim 16 wherein said molten material is gradually transitioned from helical flow to annular flow as said molten material flows through said mixing element.

19. An injection molding manifold, comprising:
    at least one melt channel formed therein, said at least one melt channel, in use, conducting a molten material, and
    a mixer insert abutting a mixing element, said mixer insert sealingly placed in a bore of said manifold to align said mixing element with said at least one melt channel.

20. The injection molding manifold of claim 19 wherein said manifold is heated.

21. The injection molding manifold of claim 19 wherein said mixer insert further comprises at least one flange that protrudes from said mixer insert and is inserted in a relief formed in a surface of said manifold.

22. The injection molding manifold of claim 21 wherein the alignment of said mixing element with said melt channel is provided by said flange.

23. The injection molding manifold of claim 21 wherein the alignment of said mixing element with said melt channel is provided by an alignment pin that interfaces with said flange.

24. The injection molding manifold of claim 21 wherein said mixer insert is rigidly affixed to said manifold by at least one fastener inserted through said flange.

25. The injection molding manifold of claim 24 wherein said fastener is threaded into said manifold.

26. The injection molding manifold of claim 21 further comprising a seal surrounding the periphery of said mixing insert for the reduction of leakage.

27. The injection molding manifold of claim 19 wherein said mixer insert is press fit into said bore.

28. The injection molding manifold of claim 19 wherein said mixer insert is affixed to said manifold by at least one threaded fastener attached to a bottom face of said mixer insert.

29. The injection molding manifold of claim 19 further comprising a seal along the periphery of said mixer insert.

30. The injection molding manifold of claim 19 wherein said mixer insert further comprises:
   a cylindrical body having a longitudinal axis perpendicular to its diameter,
   an insert passageway formed in said cylindrical body perpendicular to said longitudinal axis for receipt and retention of said mixing element.

31. The injection molding manifold of claim 19 wherein said mixer insert further comprises:
   a cylindrical body having a longitudinal axis perpendicular to its diameter,
   a first insert passageway formed in said cylindrical body parallel to said longitudinal axis for receipt and retention of said mixing element.

32. The injection molding manifold of claim 31 wherein said mixer insert further comprises at least one second passageway in communication with said first insert passageway for branching said molten material after it has flowed through said mixing element.

33. The injection molding manifold of claim 31 wherein said mixing element further comprises:
   a mixer bushing having at least one helical groove formed on an internal surface therein,
   an elongated torpedo inserted coaxially in said mixer bushing, said torpedo running from an entrance to an exit of said mixing element.

34. The injection molding manifold of claim 33 wherein said mixing element further comprises a series of lands that interface with an external surface of said torpedo.

35. The injection molding manifold of claim 34 wherein said molten material has a flow direction, and wherein said at least one helical groove decreases in depth in the direction of the molten material flow.

36. The injection molding manifold of claim 35 wherein a gap between said lands and said external surface of said torpedo gradually increases in the direction of the molten material flow.

37. The injection molding manifold of claim 33 wherein a molten material is gradually transitioned from helical flow to annular flow as said molten material flows through said mixing element.

38. An injection molding machine having a supply of molten material for communication to a mold cavity comprising;
   a manifold having at least one melt channel formed therein for conveying said molten material from said supply to said mold cavity,
   a mixer insert having a mixing element therein sealingly placed in a bore of said manifold to align said mixing element with said at least one melt channel,
   a spring element abutting said mixer insert and urging said mixing element to seal against a face of said manifold,
   a cap affixed to said manifold adjacent said spring element acting to compress said spring element.

39. An injection molding machine having a supply of molten material for communication to a plurality of mold cavities, the machine comprising:
   a manifold having at least one melt channel formed therein, said at least one melt channel, in use, conducting a molten material;
   a mixing element; and
   a mixer insert abutting the mixing element, said mixer insert sealingly placed in a bore of said manifold to align said mixing element with said at least one melt channel, said mixer insert comprising a cylindrical body having a longitudinal axis perpendicular to its diameter, a first insert passageway formed in said cylindrical body parallel to said longitudinal axis for receipt and retention of said mixing element, and at least one second passageway in communication with said first insert passageway for branching said molten material after it has flowed through said mixing element.

* * * * *